United States Patent
Li

(10) Patent No.: US 10,824,485 B2
(45) Date of Patent: Nov. 3, 2020

(54) METHODS AND DEVICES FOR BROADCASTING MESSAGES

(71) Applicant: Alibaba Group Holding Limited, George Town (KY)

(72) Inventor: Ning Li, Hangzhou (CN)

(73) Assignee: Alibaba Group Holding Limited, George Town, Grand Cayman (KY)

(*) Notice: Subject to any disclaimer, the term of this patent is extended or adjusted under 35 U.S.C. 154(b) by 0 days.

(21) Appl. No.: 16/516,841

(22) Filed: Jul. 19, 2019

(65) Prior Publication Data

US 2019/0340042 A1 Nov. 7, 2019

Related U.S. Application Data

(63) Continuation of application No. PCT/CN2018/079435, filed on Mar. 19, 2018.

(30) Foreign Application Priority Data

Mar. 24, 2017 (CN) .......................... 2017 1 0182459

(51) Int. Cl.
*G06F 9/54* (2006.01)
*G06F 16/182* (2019.01)
*H04L 9/06* (2006.01)

(52) U.S. Cl.
CPC .......... *G06F 9/542* (2013.01); *G06F 16/1837* (2019.01); *H04L 9/0637* (2013.01)

(58) Field of Classification Search
CPC .................................................. H04L 2209/38
See application file for complete search history.

(56) References Cited

U.S. PATENT DOCUMENTS

| 9,014,074 B2 | 4/2015 | Ulupinar et al. |
| 9,397,917 B2 | 7/2016 | Li et al. |
| 2009/0006536 A1 | 1/2009 | Elliott et al. |
| 2014/0007128 A1 | 1/2014 | Schroth et al. |

(Continued)

FOREIGN PATENT DOCUMENTS

| CN | 1980411 | 6/2007 |
| CN | 101801113 | 8/2010 |

(Continued)

OTHER PUBLICATIONS

Filios. Help the Bitcoin Community Reach Consensus. Feb. 2, 2016. (Year: 2016).*

(Continued)

*Primary Examiner* — Bryan Lee
(74) *Attorney, Agent, or Firm* — Fish & Richardson P.C.

(57) ABSTRACT

Embodiments of the specification disclose example methods and devices for broadcasting messages. One example method includes obtaining a first broadcast message by a first consensus node of a blockchain network. The first consensus node creates a first thread for a first message processing device corresponding to the first consensus node. The first consensus node sends the first broadcast message to the first message processing device by using the first thread. The first message processing device sends the first broadcast message to a second message processing device corresponding to a second consensus node. The first consensus node cancels the first thread.

8 Claims, 4 Drawing Sheets

(56) References Cited

U.S. PATENT DOCUMENTS

| | | | |
|---|---|---|---|
| 2015/0363783 A1 | 12/2015 | Ronca et al. | |
| 2016/0261685 A1 | 9/2016 | Chen et al. | |
| 2016/0261690 A1* | 9/2016 | Ford | H04L 67/1044 |
| 2016/0352870 A1 | 12/2016 | Manapragada et al. | |

FOREIGN PATENT DOCUMENTS

| | | |
|---|---|---|
| CN | 104579905 | 4/2015 |
| CN | 104580253 | 4/2015 |
| CN | 106446067 | 2/2017 |
| CN | 107196772 | 9/2017 |
| JP | 2014187692 | 10/2014 |
| JP | 2015043491 | 3/2015 |
| JP | 2017050763 | 3/2017 |
| KR | 101701131 | 2/2017 |
| WO | WO 2014053084 | 4/2014 |

OTHER PUBLICATIONS

Crain et al. Blockchain Consensus. May 5, 2017 (Year: 2017).*

Fund. Bitcoin:reaching consensus in distributed systems. Mar. 7, 2016. (Year: 2016).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Andersen et al., "Demoncratizing Authority in the Built Environment," Proceedings of the 4th ACM Internaitonal Conference on Systems for Energy-Efficient Built Environments, Nov. 2017, 14(3-4):10 pages.

Extended European Seach Report in European Application No. 18772238.4, dated Sep. 3, 2019, 14 pages.

Mastering Bitcoin—Unlocking Digital Cryptocurrencies, 1st ed., O'Reilly Media, Inc., Dec. 2014, pp. 111-112, 139-141, 178.

Mastering Blockchain, 2nd ed., Packt Publishing, Mar. 2017, Chapter 12, pp. 444-447.

PCT International Search Report and Written Opinion in International Application No. PCT/CN2018/079435, dated May 30, 2018, 9 pages (with partial English translation).

Web-payment.ru [online], "Results of Blockchain & Bitcoin Conference Russia 2016", Apr. 2016, retrieved on Mar. 9, 019, retreived from URL <http://web-payment.ru/blockchainitem/74/itogi-blockchain-bitcoin-conference-russia-2016/>, 12 pages (with English translation).

Dinh et al., "Blockbench: A Framework for Analyzing Private Blockchains", 2017 ACM International Conference on Management of Data, Mar. 12, 2017, 16 pages.

* cited by examiner

METHODS AND DEVICES FOR BROADCASTING MESSAGES

CROSS-REFERENCE TO RELATED APPLICATIONS

This application is a continuation of PCT Application No. PCT/CN2018/079435, filed on Mar. 19, 2018, which claims priority to Chinese Patent Application No. 201710182459.1, filed on Mar. 24, 2017, and each application is hereby incorporated by reference in its entirety.

TECHNICAL FIELD

The specification relates to the field of blockchain technologies, and in particular, to methods and devices for broadcasting messages.

BACKGROUND

In the field of blockchain technologies, a blockchain node that is responsible for performing consensus verification on a service is referred to as a consensus node. In the trend of blockchain globalization, consensus nodes are often distributed around the world.

Each consensus node usually needs to broadcast messages (for example, a service message or a consensus message) to consensus nodes in a service handling phase, a consensus verification phase, and other phases. A globalized heterogeneous network can cause instability in a message transmission process, for example, the Chinese network and the American network are heterogeneous networks, and a consensus node in the American network may fail to receive a message that is broadcast by a consensus node in the Chinese network. Therefore, to ensure that each other consensus node receives a message at a relatively high success rate, a consensus node that broadcasts the message usually creates one thread for each other consensus node, and executes, by using the thread, a task of sending the message to the another consensus node.

Specifically, after sending the message to the another consensus node by using the thread, the consensus node that broadcasts the message waits to receive a notification (for announcing that the another consensus node has received the message) returned by the another consensus node. If receiving no notification within a specified time by using the thread, the consensus node that broadcasts the message sends the message to the another consensus node again by using the thread, until the consensus node that broadcasts the message receives the notification. Alternatively, if the consensus node that broadcasts the message still receives no notification by using the thread after sending the message for multiple times, the consensus node that broadcasts the message cancels the thread. As such, it can be ensured that the another consensus node receives the message at a relatively high success rate.

However, actually, when executing, by using the thread created by the consensus node that broadcasts the message, the task of sending the message to the another consensus node, the consensus node that broadcasts the message usually needs to repeatedly send the message for multiple times. It consumes a large number of computing resources of the consensus node that broadcasts the message, causing an excessive burden on the consensus node that broadcasts the message.

SUMMARY

Embodiments of the specification provide methods and devices for broadcasting messages, to alleviate a problem that the existing method for broadcasting messages causes an excessive burden on a consensus node that broadcasts a message.

To alleviate the previous technical problem, the embodiments of the specification are implemented as follows:

An embodiment of the specification provides a method for broadcasting messages, including: obtaining, by a consensus node of a blockchain network, a first broadcast message; creating a first thread for a message processing device corresponding to the consensus node, and sending the first broadcast message to the message processing device by using the first thread, so that the message processing device sends the first broadcast message to a message processing device corresponding to another consensus node; and cancelling the first thread.

An embodiment of the specification provides another method for broadcasting messages, including: receiving, by a message processing device, a first broadcast message sent by a consensus node corresponding to the message processing device; creating a second thread for a message processing device corresponding to each other consensus node, and sending the first broadcast message to the message processing device corresponding to the another consensus node by using the second thread; and cancelling the second thread in response to determining that the message processing device corresponding to the another consensus node receives the first broadcast message.

An embodiment of the specification provides a device for broadcasting messages, including: an acquisition module, configured to obtain a first broadcast message; a sending module, configured to create a first thread for a message processing device corresponding to the device, and send the first broadcast message to the message processing device by using the first thread, so that the message processing device sends the first broadcast message to a message processing device corresponding to another consensus node; and a cancellation module, configured to cancel the first thread.

An embodiment of the specification provides another device for broadcasting messages, including: a first receiving module, configured to receive a first broadcast message sent by a consensus node corresponding to the device; a sending module, configured to create a second thread for a message processing device corresponding to each other consensus node, and send the first broadcast message to the message processing device corresponding to the another consensus node by using the second thread; and a cancellation module, configured to cancel the second thread in response to determining that the message processing device corresponding to the another consensus node receives the first broadcast message.

It can be learned from the previous technical solutions provided in the embodiments of the specification that, in the embodiments of the specification, one message processing device is allocated to each consensus node, and a work of broadcasting a message between consensus nodes is handed over to message processing devices. For a certain consensus node, a message processing device corresponding to the consensus node can create a thread for a message processing device corresponding to another consensus node, to execute a message broadcasting task, until the message processing device corresponding to the another consensus node receives a broadcast message. As such, the thread for executing the message broadcasting task consumes only a computing resource of the message processing device without consuming a resource of the consensus node. Therefore, no burden is caused on the consensus node, so that the consensus node can perform consensus verification on a service more efficiently.

BRIEF DESCRIPTION OF DRAWINGS

To describe the technical solutions in the embodiments of the specification or in the existing technology more clearly, the following briefly describes the accompanying drawings needed for describing the embodiments or the existing technology. Apparently, the accompanying drawings in the following description merely show some embodiments of the specification, and a person of ordinary skill in the art can still derive other drawings from these accompanying drawings without creative efforts.

DESCRIPTION OF EMBODIMENTS

Embodiments of the specification provide a method and device for broadcasting messages.

To make a person skilled in the art understand the technical solutions in the specification better, the following clearly and comprehensively describes the technical solutions in the embodiments of the specification with reference to the accompanying drawings in the embodiments of the specification. Apparently, the described embodiments are merely some but not all of the embodiments of the specification. All other embodiments obtained by a person of ordinary skill in the art based on the embodiments of the specification without creative efforts shall fall within the protection scope of the specification.

The technical solutions provided in the embodiments of the specification are described in detail below with reference to the accompanying drawings.

Figure 1:
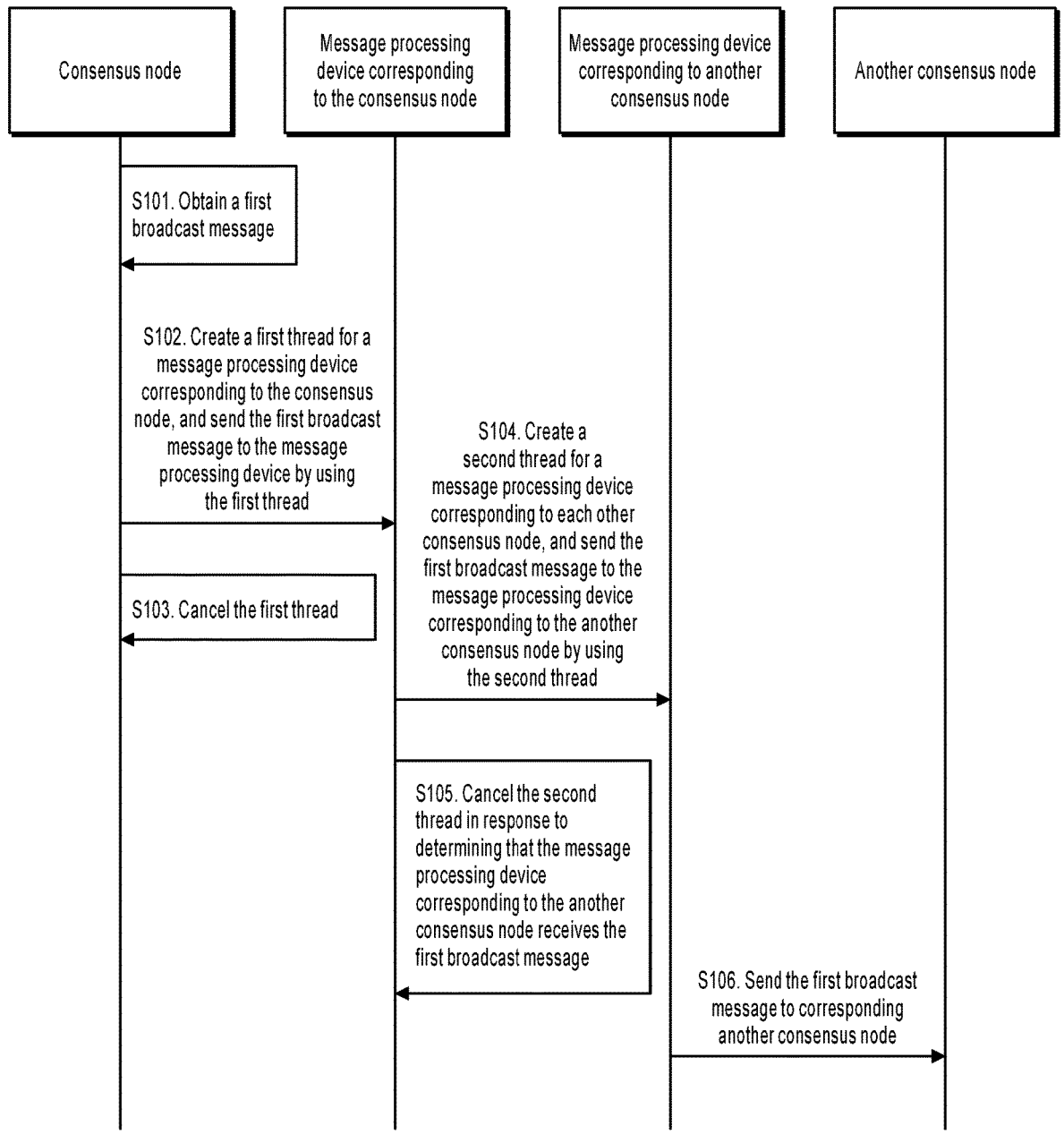
FIG. 1 is a flowchart illustrating an example of a method for broadcasting messages, according to embodiments of the specification.

FIG. 1 is a flowchart illustrating a method for broadcasting messages, according to an embodiment of the specification. The method for broadcasting messages includes the following steps.

S101. A consensus node obtains a first broadcast message.

In some embodiments of the specification, the consensus node is a blockchain node that participates in consensus verification on a service in a blockchain network. In a typical blockchain network, all blockchain nodes can participate in consensus verification as consensus nodes. However, in a special blockchain network (for example, a blockchain network that includes a consortium-chain subnetwork and a public-chain subnetwork), not all blockchain nodes can participate in consensus verification as consensus nodes.

It is an application scenario of the embodiments of the specification that in a service handling phase, a consensus verification phase, and other phases, consensus nodes need to broadcast or send messages to each other.

The service handling phase means that a certain consensus node receives a service message, and broadcasts the service message to other consensus nodes, so that all consensus nodes receive the service message. It facilitates subsequent consensus verification on the service message. The consensus verification phase is a phase in which all consensus nodes comply with a certain consensus algorithm to reach a consensus on a verification result. In the consensus verification phase, all the consensus nodes need to send verification messages to each other, to reach a consensus.

In some embodiments of the specification, the first broadcast message can be the service message, the verification message, or a message that is broadcast or sent by a certain consensus node to another consensus node.

It is worthwhile to note that the method can be performed by any consensus node. In the service processing phase, the consensus node can receive a service message sent by a client or a non-consensus node, and use the service message as the obtained first broadcast message. In the consensus verification phase, the consensus node can generate a verification message after verifying the service message, and use the verification message as the obtained first broadcast message.

S102. The consensus node creates a first thread for a message processing device corresponding to the consensus node, and sends the first broadcast message to the message processing device by using the first thread.

S103. The consensus node cancels the first thread.

In some embodiments of the specification, the consensus node can send the first broadcast message to the message processing device corresponding to the consensus node, and completely hand a task of broadcasting or sending the first broadcast message over to the message processing device corresponding to the consensus node for processing, so that the message processing device ensures that a message processing device of another consensus node successfully receives the first broadcast message. As such, the consensus node does not need to consume computing resources to ensure that all other consensus nodes receive the first broadcast message as many as possible.

Figure 2:
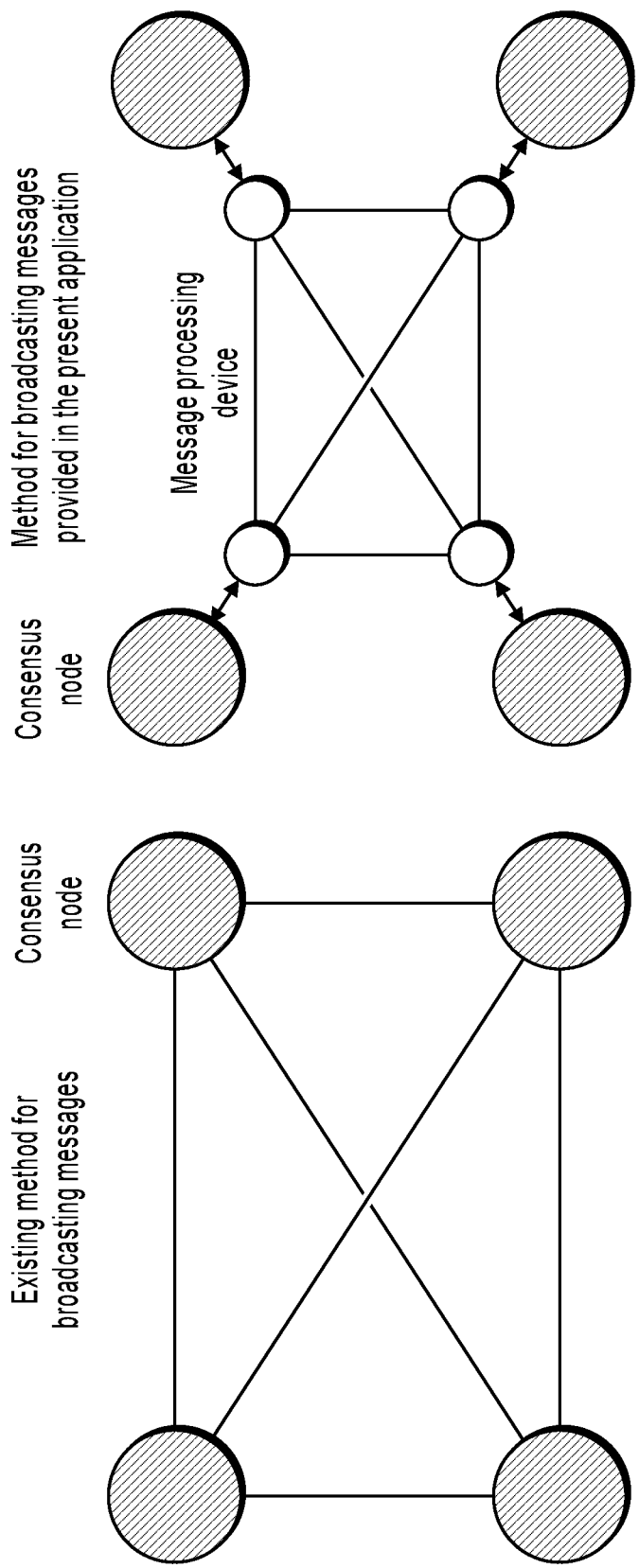
FIG. 2 is a schematic diagram illustrating an example of comparing the existing method for broadcasting messages with a method for broadcasting messages provided in the specification.

FIG. 2 is a schematic diagram illustrating an example of comparing the existing method for broadcasting messages with a method for broadcasting messages provided in the specification. As shown in FIG. 2, the message processing device corresponding to the consensus node is a computing device independent of the consensus node. Message exchange between consensus nodes is performed by message processing devices respectively corresponding to the consensus nodes.

That is, the consensus node only needs to create the first thread for the message processing device corresponding to the consensus node, and can cancel the first thread after sending the first broadcast message to the message processing device corresponding to the consensus node by using the first thread, without consuming a computing resource to continuously maintain the first thread.

The first thread is a thread created by the consensus node for the message processing device corresponding to the consensus node, and the second thread described below is a thread created by the message processing device for the message processing device corresponding to the another consensus node.

Actually, the consensus node uses an asynchronous call technology to create the first thread that is used to send the first broadcast message to the message processing device corresponding to the consensus node. After sending the first broadcast message by using the first thread, the consensus node can directly cancel the first thread without caring whether the message processing device receives the first broadcast message.

It is worthwhile to note that the consensus node and the message processing device corresponding to the consensus node are usually not distributed in a heterogeneous network. That is, information exchange between the consensus node and the message processing device corresponding to the consensus node is stable. Therefore, the message processing device usually can successfully receive, at one time, a message sent by the consensus node corresponding to the message processing device.

Further, to completely ensure that the first broadcast message is not lost in a process of transmitting the first broadcast message from the consensus node to the corresponding message processing device, a regional private line can be used to connect the consensus node to the message processing device corresponding to the consensus node, to alleviate, as much as possible, network disturbance that may exist between the consensus node and the message processing device corresponding to the consensus node.

In addition to instructing the message processing device corresponding to the consensus node to broadcast the message, the consensus node can further receive, by using the message processing device corresponding to the consensus node, a message that is broadcast by the another consensus node.

Specifically, the consensus node can receive a second broadcast message sent by the message processing device corresponding to the consensus node. The second broadcast message is broadcast by the message processing device corresponding to the another consensus node. The message processing device can receive the second broadcast message that is broadcast by the message processing device corresponding to the another consensus node, and then send the second broadcast message to the consensus node.

It is worthwhile to note that both the first broadcast message and the second broadcast message are broadcast messages that are broadcast by consensus nodes, and both the first broadcast message and the second broadcast message can be service messages, verification messages, etc.

S104. The message processing device creates a second thread for one or more message processing devices corresponding to one or more other consensus nodes, and sends the first broadcast message to the one or more message processing devices corresponding to the one or more other consensus nodes by using the second thread.

S105. The message processing device cancels the second thread in response to determining that the one or more message processing devices corresponding to the one or more other consensus nodes receives the first broadcast message.

In the existing technology, the consensus node is responsible for message broadcasting. The consensus node creates a thread that occupies a computing resource of the consensus node, and uses the thread to ensure, as many as possible, that all other consensus nodes receive a message that is broadcast by the consensus node.

In some embodiments of the specification, the consensus node only needs to send the first broadcast message to the message processing device corresponding to the consensus node. As a computing device independent of the consensus node, the message processing device can be independently responsible for message broadcasting. As such, the consensus node is released, so that the consensus node can concentrate limited computing resources to perform consensus verification work more efficiently.

In some embodiments of the specification, the message processing device creates the second thread for the one or more message processing devices corresponding to one or more other consensus nodes, and uses the second thread to consume a computing resource of the message processing device to wait to confirm that the message processing devices corresponding to the other consensus nodes successfully receives the first broadcast message.

Specifically, the message processing device can send the first broadcast message to the one or more message processing devices corresponding to the one or more other consensus nodes by using the second thread created for the message processing devices corresponding to the other consensus nodes; count a number of received response signals, where the response signal is returned by the message processing devices corresponding to the other consensus nodes after receiving the first broadcast message; and resend the first broadcast message by using each second thread in response to determining that the counted number is less than a specific value, until the counted number of received response signals is not less than the specific value, where the specific value is an integer greater than 0. The specific value is configurable. A higher specific value can ensure that more consensus nodes receive the first broadcast message, and therefore the consensus node broadcasts the message at a higher success rate. The specific value is not specifically limited in the specification.

Further, if the counted number is less than the specific value, the message processing device can continue sending, by using a second thread corresponding to a message processing device that returns no response signal, the first broadcast message to the message processing device that returns no response signal, until the total number of received response signals counted in previous times is not less than the specific value. Alternatively, the message processing device can send the first broadcast message to all other message processing devices again by using all second threads, until the number of received response signals counted at a next time is not less than the specific value.

Further, after the message processing device sends the first broadcast message to another certain message processing device for a specified number of times by using a second thread, if the message processing device still receives, by using the second thread, no response signal returned by the another message processing device, the message processing device can stop sending the first broadcast message to the another message processing device. After a specified period, the message processing device continues sending the first broadcast message to the another message processing device.

For example, the message processing device can first broadcast the first broadcast message to other message processing devices, then determine another message processing device that returns no response signal (that is, a message processing device that fails to receive the first broadcast message), and then resend the first broadcast message to the message processing device that fails to receive the first broadcast message. These operations are repeated. After the message processing device repeatedly sends the first broadcast message to the same another message processing device for three times, it indicates that there is a temporary transmission problem to be resolved (the problem may be caused due to a failure of the message processing device that fails to receive the first broadcast message or due to a large network fault). Therefore, the message processing device first stops sending the first broadcast message to the another message processing device, and then continues sending the first broadcast message to the another message processing device after waiting for a long time (the transmission problem may have been resolved).

In some embodiment of the specification, the message processing device cancels the second thread after ensuring that the message processing devices corresponding to each other consensus node receives the first broadcast message. It is worthwhile to note that the message processing device can use various message delivery policies such as delay delivery and compensation delivery (a subject that fails to receive the message actively requests to compensate for the message) to ensure that the message processing device corresponding to each other consensus node receives the first broadcast message. A message delivery policy used by the message processing device is not specifically limited in the specification.

It can be learned from the previous descriptions that, the message processing device actually uses a synchronization call technology to create, for the message processing device corresponding to each other consensus node, one second thread that is used to send the first broadcast message to the message processing device corresponding to each other consensus node. After sending the first broadcast message by using the second thread, the message processing device still uses the second thread to wait to confirm that the message processing device corresponding to each other consensus node receives the first broadcast message. If the message processing device corresponding to each other consensus node fails to receive the first broadcast message, the message processing device resends the first broadcast message to the message processing device corresponding to each other consensus node by using the second thread. The second thread is cancelled only until the message processing device corresponding to each other consensus node certainly receives the first broadcast message or a condition for stopping sending is triggered.

S106. The one or more message processing devices corresponding to the one or more other consensus nodes send the first broadcast message to the corresponding consensus nodes.

As previously described, each of the one or more other consensus nodes can receive, by using the message processing device corresponding to the consensus node, a message that is broadcast by another consensus node.

According to the method for broadcasting messages shown in FIG. 1, one message processing device is allocated to each consensus node, and a work of broadcasting a message between consensus nodes is handed over to message processing devices. For a certain consensus node, a message processing device corresponding to the consensus node can create a thread for a message processing device corresponding to each other consensus node, to execute a message broadcasting task, until the message processing device corresponding to the another consensus node receives a broadcast message. As such, the thread for executing the message broadcasting task consumes only a computing resource of the message processing device without consuming a resource of the consensus node. Therefore, no burden is caused on the consensus node, so that the consensus node can perform consensus verification on a service more efficiently.

Figure 3:
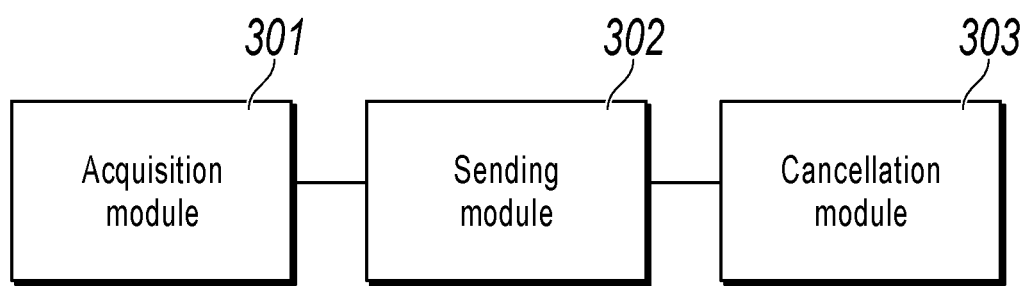
FIG. 3 is a schematic diagram illustrating an example of a device for broadcasting messages, according to embodiments of the specification.

Based on the method for broadcasting messages shown in FIG. 1, an embodiment of the specification further correspondingly provides a device for broadcasting messages. As shown in FIG. 3, the device for broadcasting messages includes: an acquisition module 301, configured to obtain a first broadcast message; a sending module 302, configured to create a first thread for a message processing device corresponding to the device, and send the first broadcast message to the message processing device by using the first thread, so that the message processing device sends the first broadcast message to a message processing device corresponding to another consensus node; and a cancellation module 303, configured to cancel the first thread.

The device is connected to the message processing device by using a regional private line.

The device further includes a receiving module 304, configured to receive a second broadcast message sent by the message processing device corresponding to the device, where the second broadcast message is broadcast by the message processing device corresponding to the another consensus node.

Figure 4:
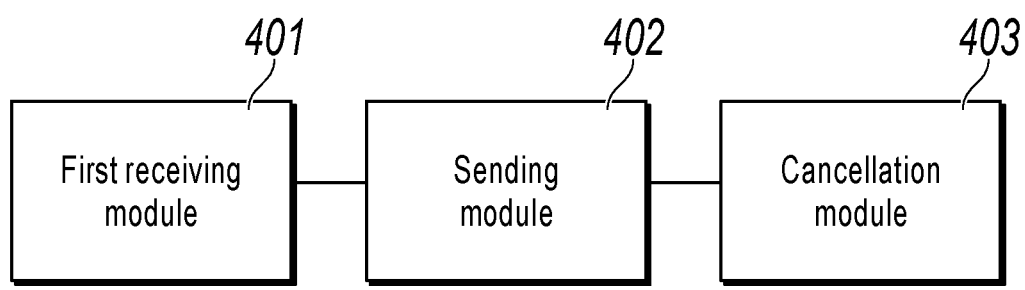
FIG. 4 is a schematic diagram illustrating an example of a device for broadcasting messages, according to embodiments of the specification.

Based on the method for broadcasting messages shown in FIG. 1, an embodiment of the specification further correspondingly provides another device for broadcasting messages. As shown in FIG. 4, the device for broadcasting messages includes: a first receiving module 401, configured to receive a first broadcast message sent by a consensus node corresponding to the device; a sending module 402, configured to create a second thread for a message processing device corresponding to each other consensus node, and send the first broadcast message to the message processing device corresponding to the another consensus node by using the second thread; and a cancellation module 403, configured to cancel the second thread in response to determining that the message processing device corresponding to the another consensus node receives the first broadcast message.

The cancellation module 403 is configured to count the number of received response signals by using each second thread, where the response signal is returned by the message processing device corresponding to the another consensus node after receiving the first broadcast message; and resend the first broadcast message by using each second thread in response to determining that the counted number is less than a specific value, until the counted number of received response signals is not less than the specific value, where the specific value is an integer greater than 0.

The device further includes a second receiving module 404, configured to receive a second broadcast message that is broadcast by the message processing device corresponding to the another consensus node; and send the second broadcast message to the consensus node.

In the 1990s, whether a technical improvement is a hardware improvement (for example, an improvement to a circuit structure such as a diode, a transistor, or a switch) or a software improvement (an improvement to a method procedure) can be clearly distinguished. However, as technologies develop, current improvements to many method procedures can be considered as direct improvements to hardware circuit structures. Almost all designers program an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system into a PLD without requesting a chip manufacturer to design and manufacture an application-specific integrated circuit chip. In addition, at present, instead of manually manufacturing an integrated chip, this type of programming is mostly implemented by using "logic compiler" software. The "logic compiler" software is similar to a software compiler used to develop and write a program. Original code needs to be written in a particular programming language before being compiled. The language is referred to as a hardware description language (HDL). There are many HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL). The very-high-speed integrated circuit hardware description language (VHDL) and Verilog are most commonly used at present. A person skilled in the art should also understand that a hardware circuit that implements a logical method procedure can be easily obtained provided that the method procedure is logically programmed and programmed into an integrated circuit by using the foregoing several hardware description languages.

A controller can be implemented in any appropriate way. For example, the controller can be in a form of a microprocessor, a processor, a computer readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. A memory controller can alternatively be implemented as a part of control logic of a memory. A person skilled in the art also knows that, in addition to implementing the controller by using the computer readable program code, method steps can be logically programmed to enable the controller to implement the same function in the form of the logic gate, the switch, the application-specific integrated circuit, the programmable logic controller, or the built-in microcontroller. Therefore, the controller can be considered as a hardware component, and a device that is included in the controller and configured to implement various functions can also be considered as a structure in the hardware component. Alternatively, the device configured to implement various functions can even be considered as both a software module for implementing the method and a structure in the hardware component.

The system, device, module, or unit illustrated in the previous embodiments can be specifically implemented by using a computer chip or an entity, or by using a product having a certain function. An example of device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the previous device is described by dividing the device into various units based on functions. Certainly, when the specification is implemented, functions of the units can be implemented in one or more pieces of software and/or hardware.

A person skilled in the art should understand that the embodiments of the specification can be provided as a method, a system, or a computer program product. Therefore, the specification can use a form of hardware only implementations, software only implementations, or implementations with a combination of software and hardware. In addition, the specification can use a form of a computer program product that is implemented on one or more computer-usable storage media (including but not limited to a magnetic disk storage, a CD-ROM, an optical memory, etc.) that include computer-usable program code.

The specification is described with reference to the flowcharts and/or block diagrams of the method, the device (system), and the computer program product according to the embodiments of the specification. It is worthwhile to note that computer program instructions can be used to implement each process and/or each block in the flowcharts and/or the block diagrams and a combination of processes and/or blocks in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate a device for implementing a specific function in one or more processes in the flowcharts and/or in one or more blocks in the block diagrams.

These computer program instructions can alternatively be stored in a computer readable memory that can instruct a computer or another programmable data processing device to work in a specific way, so that the instructions stored in the computer readable memory generate an artifact that includes an instruction device. The instruction device implements a specific function in one or more processes in the flowcharts and/or in one or more blocks in the block diagrams.

These computer program instructions can alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), one or more input/output interfaces, one or more network interfaces, and one or more memories.

The memory can include a non-persistent memory, a random access memory (RAM), a nonvolatile memory, and/or another form of memory in computer readable media, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette, a magnetic tape, a magnetic disk memory or another magnetic storage device, or any other non-transmission medium that can be used to store information that is accessible to the computing device.

Based on the definition in this specification, the computer readable medium does not include transitory computer readable media (transitory media) such as a modulated data signal and carrier.

It is worthwhile to further note that, the terms "include", "comprise", or their any other variants are intended to cover a non-exclusive inclusion, so that a process, a method, a product, or a device that includes a list of elements not only includes those elements but also includes other elements that are not expressly listed, or further includes elements inherent to such process, method, product, or device. Without more constraints, an element preceded by "includes a . . . " does not preclude the existence of additional identical elements in the process, method, product, or device that includes the element.

A person skilled in the art should understand that the embodiments of the specification can be provided as a method, a system, or a computer program product. Therefore, the specification can use a form of hardware only embodiments, software only embodiments, or embodiments with a combination of software and hardware. In addition, the specification can use a form of a computer program product that is implemented on one or more computer-usable storage media (including but not limited to a magnetic disk storage, a CD-ROM, an optical memory, etc.) that include computer-usable program code.

The specification can be described in the general context of computer executable instructions executed by a computer, for example, a program module. Generally, the program module includes a routine, a program, an object, a component, a data structure, etc. for executing a specific task or implementing a specific abstract data type. The specification can alternatively be practiced in distributed computing environments. In these distributed computing environments, tasks are performed by remote processing devices that are connected through a communications network. In the distributed computing environments, the program module can be located in both local and remote computer storage media including storage devices.

The embodiments in the present specification are described in a progressive way. For same or similar parts of the embodiments, mutual references can be made to the embodiments. Each embodiment focuses on a difference from other embodiments. Particularly, a system embodiment is basically similar to a method embodiment, and therefore is described briefly. For related parts, references can be made to some descriptions in the method embodiment.

The previous descriptions are merely embodiments of the specification, and are not intended to limit the specification. A person skilled in the art can make various modifications and changes to the specification. Any modification, equivalent replacement, improvement, etc. made without departing from the spirit and principle of the specification shall fall within the scope of the claims in the specification.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate embodiments may be implemented, in combination, in a single embodiment, while features described as a single embodiment may be implemented in multiple embodiments, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for broadcasting messages, the method comprising:
   obtaining, by a first consensus node of a blockchain network, a first broadcast message;
   creating, by the first consensus node, a first thread for a first message processing device corresponding to the consensus node;
   sending, by the first consensus node, the first broadcast message to the first message processing device by using the first thread, wherein the first message processing device sends the first broadcast message to a second message processing device corresponding to a second consensus node;
   cancelling, by the first consensus node, the first thread;
   creating, by the first message processing device, a second thread between the first message processing device and the second message processing device;
   sending, by the first message processing device, the first broadcast message to the second message processing device using the second thread;
   determining that the second message processing device receives the first broadcast message; and
   cancelling the second thread in response to determining that the second message processing device receives the first broadcast message.

2. The computer-implemented method according to claim 1, wherein the first consensus node is connected to the first message processing device by using a regional private line.

3. The computer-implemented method according to claim 1, further comprising:
   receiving a second broadcast message from the first message processing device, wherein the second broadcast message has been broadcast by the second message processing device corresponding to the second consensus node.

4. The method according to claim 1, wherein the determining that the second message processing device receives the first broadcast message comprises:
   counting response signals returned, over the second thread, by the second message processing device in response to receiving the first broadcast message to obtain a number of returned response signals; and
   resending, using the second thread, the first broadcast message in response to determining that the number of returned response signals is less than a specific value, until the counted number of received response signals is not less than the specific value, wherein the specific value is an integer greater than 0.

5. The method according to claim 1, further comprising:
   receiving, at the first message processing device, a second broadcast message that is broadcast by the second message processing device; and
   sending the second broadcast message to the first consensus node.

6. A system for broadcasting messages, the system comprising:
   a first consensus node; and
   a first message processing device,
   wherein the first consensus node is configured to:
      create a first thread for the first message processing device corresponding to the first consensus node;
      send a first broadcast message to the first message processing device by using the first thread; and cancel the first thread;
wherein the first message processing device comprises:
a first receiving module, configured to receive the first broadcast message sent by the first consensus node corresponding to the first message processing device;
a sending module, configured to:
   create a second thread for a second message processing device corresponding to a second consensus node, and
   send the first broadcast message to the second message processing device corresponding to the second consensus node by using the second thread; and
a cancellation module, configured to cancel the second thread in response to determining that the second message processing device corresponding to the second consensus node receives the first broadcast message.

7. The system according to claim 6, wherein the cancellation module is configured to:
count response signals returned, over the second thread, by the second message processing device in response to receiving the first broadcast message to obtain a number of returned response signals; and
resend, using the second thread, the first broadcast message in response to determining that the number of returned response signal is less than a specific value, until a counted number of received response signals is not less than the specific value, wherein the specific value is an integer greater than 0.

8. The system according to claim 7, wherein the first message processing device further comprises:
a second receiving module, configured to:
   receive a second broadcast message that is broadcast by the second message processing device corresponding to the second consensus node; and
   send the second broadcast message to the first consensus node.

* * * * *